(12) United States Patent
Houck et al.

(10) Patent No.: US 7,616,896 B2
(45) Date of Patent: Nov. 10, 2009

(54) WIRELESS OPTICAL DATA PROBE

(75) Inventors: Thomas P. Houck, West Lafayette, IN (US); Claudio Alvizuri, Plainfield, IL (US)

(73) Assignee: Probetec, West Lafayette, IN (US)

( * ) Notice: Subject to any disclaimer, the term of this patent is extended or adjusted under 35 U.S.C. 154(b) by 465 days.

(21) Appl. No.: 11/220,975

(22) Filed: Sep. 7, 2005

(65) Prior Publication Data

US 2007/0053693 A1 Mar. 8, 2007

(51) Int. Cl.
*H04B 10/00* (2006.01)
(52) U.S. Cl. ........................ 398/115; 398/116
(58) Field of Classification Search ......... 398/115–117; 340/870.02
See application file for complete search history.

(56) References Cited

U.S. PATENT DOCUMENTS

| | | | |
|---|---|---|---|
| 4,213,119 A * | 7/1980 | Ward et al. | 340/870.02 |
| 5,528,233 A * | 6/1996 | Hansell | 340/870.28 |
| 6,311,105 B1 * | 10/2001 | Budike, Jr. | 700/291 |
| 6,737,985 B1 * | 5/2004 | Garrard et al. | 340/870.02 |
| 6,956,500 B1 * | 10/2005 | Ducharme et al. | 340/870.02 |
| 7,203,425 B1 * | 4/2007 | Keller et al. | 398/123 |
| 2004/0061490 A1 * | 4/2004 | Huber et al. | 324/156 |
| 2004/0230711 A1 * | 11/2004 | Moon et al. | 710/8 |
| 2005/0110656 A1 * | 5/2005 | Patterson et al. | 340/870.02 |
| 2005/0184881 A1 * | 8/2005 | Dusenberry et al. | 340/870.02 |
| 2006/0259254 A1 * | 11/2006 | Swarztrauber et al. | 702/64 |

OTHER PUBLICATIONS

"Maxim 1uA supply-current, True +3V to +5.5V RS-232 Transceivers with AutoShutdown" manufactured in Oct. 2003.*

* cited by examiner

*Primary Examiner*—Dalzid Singh
(74) *Attorney, Agent, or Firm*—Maginot, Moore & Beck

(57) ABSTRACT

A portable data probe includes a portable housing, an optical transceiver circuit and a wireless communication circuit. The optical transceiver circuit is disposed substantially within the portable housing, but is also configured to be in optical communication with an exterior of the portable housing. The optical transceiver circuit is operable to convert between electrical signals and corresponding optical signals. The wireless communication circuit is also disposed substantially within the housing, and is operably coupled to the optical transceiver circuit. The wireless communication circuit is operable to communicate wireless signals to a remote wireless circuit.

13 Claims, 9 Drawing Sheets

WIRELESS OPTICAL DATA PROBE

FIELD OF THE INVENTION

The present invention relates to probe devices, and more particularly, to portable data gathering probes.

BACKGROUND OF THE INVENTION

Electrical devices often have the capability to share data, information, or operational parameters with other devices. For sophisticated devices, such as general purpose computers, personal data assistants and the like large, bandwidth wired or wireless RF communication schemes and devices are typically employed. By contrast, for devices with limited need for communication capabilities, sharing data may be accomplished through the use of a communication probe, such as an optical probe. Optical communications require little complexity of circuitry, and therefore are relatively inexpensive.

One device that benefits from the use of optical probe is a utility meter. A utility meter is a device that measures the consumption of a commodity, such as gas, water or electricity. From time to time, data must be gathered from the meter for billing, planning or other purposes. Many utility meters presently in use include an optical port that allows for an external device, such as a portable computing device, to obtain meter data from the utility meter and/or provide meter operating commands to the utility meter. Optical probes are advantageous for such purposes because optical probes do not require exposed electrical connections or points.

In particular, because metering devices can be located outdoors, metering devices must be able to withstand harsh, external environments. To withstand such environments, the number and type of exposed electrical connections to the meter is advantageously limited. The use of optical probes allows for local data transfer without requiring an exposed electrical plug or jack, thereby inherently isolating the technician from the high voltage and/or current inside the meter.

Optical probes for utility meters are therefore in widespread use. Optical probes can be used to provide data communication with devices other than meters as well. A typical optical probe arrangement includes an optical transceiver housed in small plastic sheath, an electrical cord that extends from the sheath to a length of a few feet, and an electrical plug on the end of the cord opposite to the optical transceiver.

In normal use, the electrical plug connects to a laptop computer or other portable computing device, and the optical transceiver is placed in the proximity of an optical port on the device (e.g. meter). The meter circuitry generates optical signals containing meter data and optically communicates the data to the optical transceiver in the probe. The probe then converts the signals into electrical signals and communicates the signals through the electrical cord to the plug. The attached computer receives the electrical signals through the plug and then stores, displays or further processes the meter information from the electrical signals.

While the above described probe arrangement has enjoyed widespread acceptance in certain markets, the probes are nevertheless prone to malfunction due to their extensive use. Accordingly, there is a need for an optical data probe that is less prone to malfunction than existing probe designs.

SUMMARY OF THE INVENTION

The present invention addresses the above need, as well as others, by providing a wireless probe apparatus and accompanying method. The wireless probe includes an optical transceiver that is operably connected to a wireless transmission device. The optical transceiver and the wireless transmission device are housed within a portable housing which preferably includes a battery or other energy storage device.

A first embodiment of the invention is a portable data probe that includes a portable housing, an optical transceiver circuit and a wireless communication circuit. The optical transceiver circuit is disposed substantially within the portable housing, but is also configured to be in optical communication with an exterior of the portable housing. The optical transceiver circuit is operable to convert between electrical signals and corresponding optical signals. The wireless communication circuit is also disposed substantially within the housing, and is operably coupled to the optical transceiver circuit. The wireless communication circuit is operable to communicate wireless signals to a remote wireless circuit.

The remote wireless circuit may suitably include a general purpose laptop computing device, a personal data assistant, or other computing device. The above described embodiment eliminates the need for a cable or cord that stretches between the computing device and the external optical communication device. Because the cable has been found to be a source of malfunctions, the elimination of the cable increases the reliability of the probe.

Several other inventive features of embodiments described herein may be incorporated individually or as a group into an improved probe arrangement.

The above described features and advantages, as well as others, will become more readily apparent to those of ordinary skill in the art by reference to the following detailed description and accompanying drawings.

DETAILED DESCRIPTION

Figure 1:
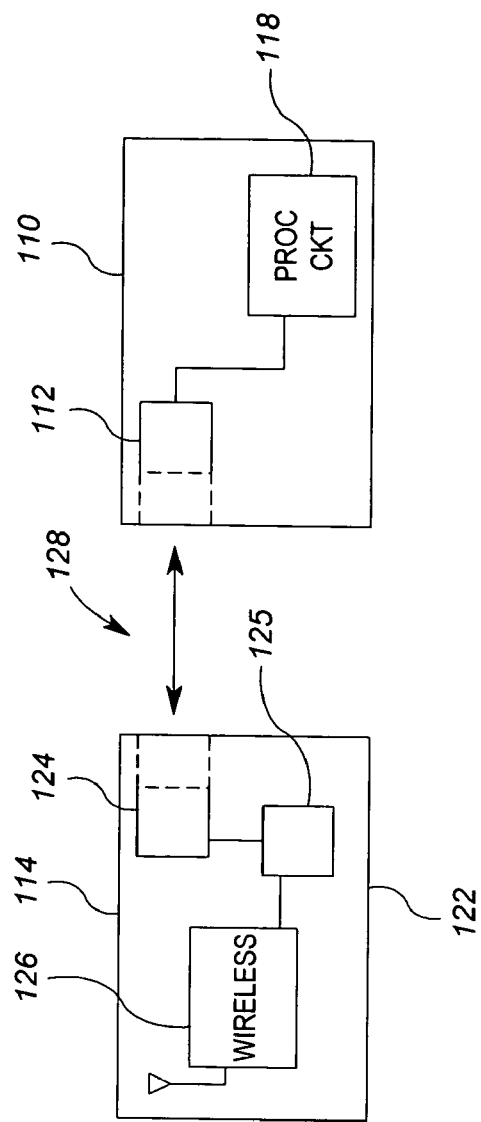
FIG. 1 shows a block diagram of an exemplary arrangement for obtaining data from a utility meter according to the invention.
Figure 1:
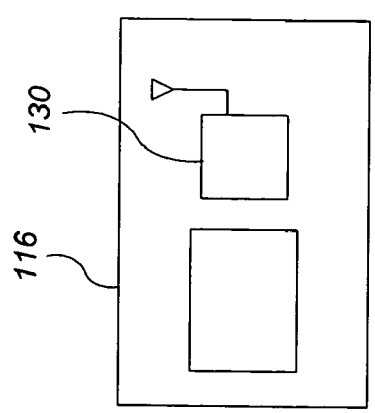

FIG. 1 shows an exemplary arrangement 100 for obtaining data from a utility meter according to embodiments of the invention. The arrangement 100 includes a utility meter 110, a data probe 114, and a computing device 116. The utility meter 110 is a meter having optical communication capabilities. Such meters are well known and include by way of non-limiting example the S-4 Meter available from Landis+ Gyr, Inc., of Lafayette, Indiana. In general, the meter 110 includes, among other things, a processing circuit 118 and an optical transceiver or optical port 112.

The data probe 114 of the exemplary embodiment of FIG. 1 includes a portable housing 122, an optical transceiver circuit 124, a power supply 125 and a wireless communication circuit 126. The optical transceiver circuit 124, which is disposed substantially within the portable housing 122, is a circuit that is operable to convert between electrical signals and corresponding optical signals. The optical transceiver circuit 124 is configured to be in optical communication with an exterior 128 of the portable housing 122. Because the optical transceiver circuit 124 is in optical communication with the exterior 128, the optical transceiver circuit 124 can communicate with another device, such as the optical port 112 of the utility meter 110.

The wireless communication circuit 126 is disposed substantially within the housing 122, and is operably coupled to the optical transceiver circuit 124. In general, the wireless communication circuit 126 is operable to communicate wireless signals to another wireless device. In the exemplary embodiment described herein, the wireless communication circuit 126 is operable to use relatively short-range, wideband signals such as Bluetooth standard signals.

The power supply 125 is a circuit operable to provide bias power to the communication circuit 126 and optical transceiver circuit 124. The power supply 125 in preferred embodiments is battery powered to allow for full wireless operation. Further detail regarding a suitable power supply circuit is provided below in connection with FIG. 4c.

The computing device 116 is a processing circuit and associated elements that may be used as a data store, data processing device, or data communication device. By way of example, the computing device 116 may suitably be a general purpose laptop computer, a personal data assistant, or the like. The computing device 116 may also be a proprietary computing device. Preferably, the computing device 116 is a portable device. The computing device 116 includes a wireless communication circuit 130 that is operable to communicate signals wirelessly with the communication circuit 126 of the data probe 114. The wireless communication circuit 130 may either be an integral part of the computing device 116, for example, a built-in wireless modem device, or an add-on peripheral.

Figure 2A:
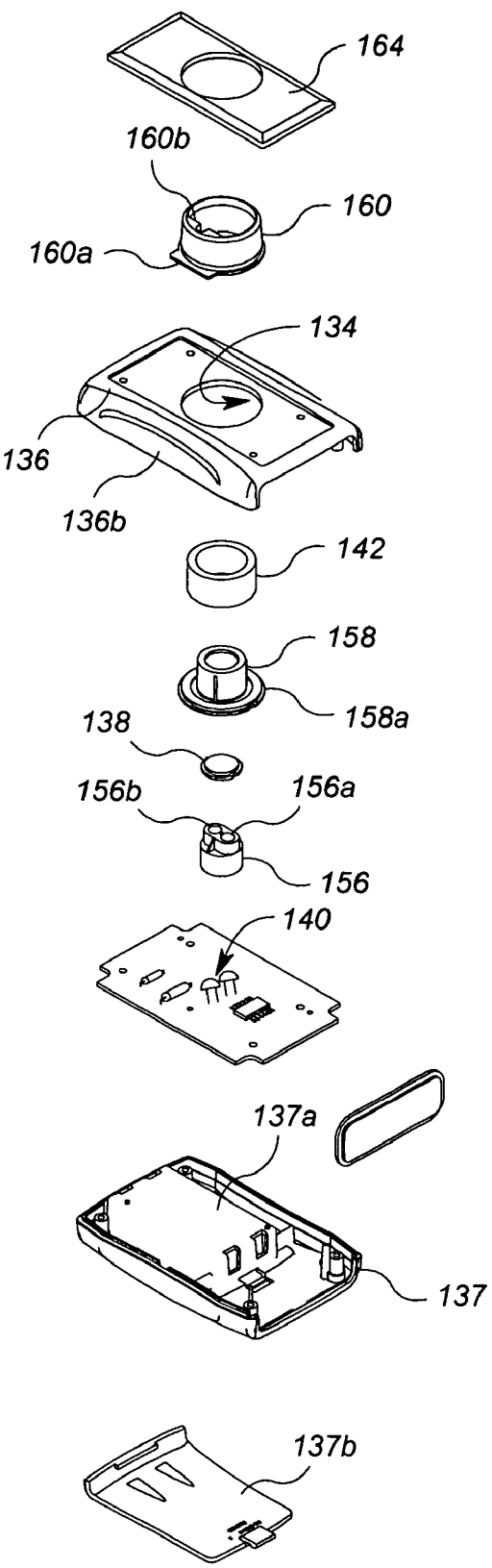
FIG. 2 shows a partially exploded view of an exemplary embodiment of a probe unit that may be used in the arrangement of FIG. 1, among others.
Figure 2B:
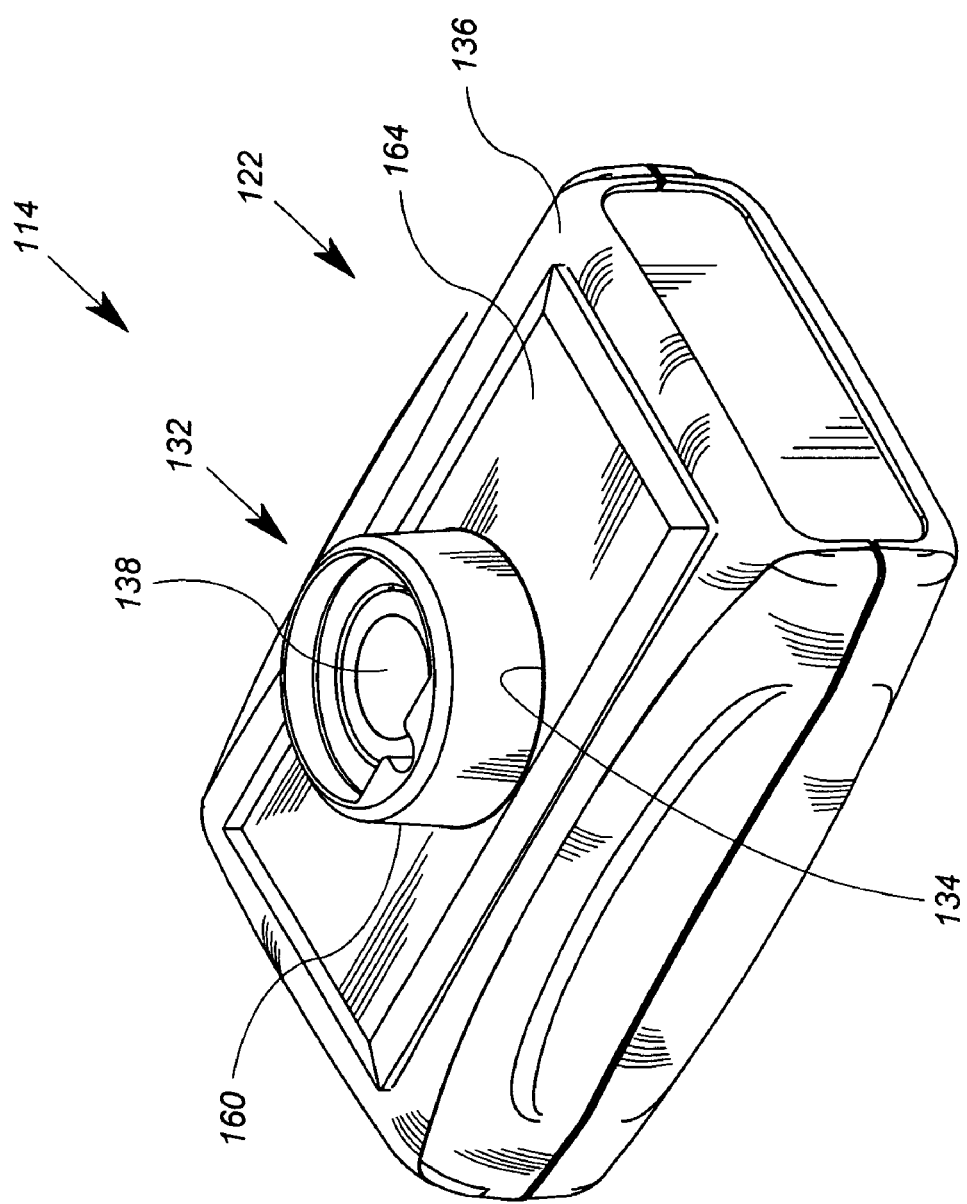

FIG. 2a shows a partially exploded view of an exemplary embodiment of the data probe 114 with a portion of the housing 122 removed. FIG. 2b shows a perspective view of the probe 114 in fully assembled format. Reference is made to FIGS. 2a and 2b simultaneously.

The housing 122 of the data probe 114 includes an interface 132 through which the optical communication circuit 124, not shown in FIGS. 2a and 2b, may communicate optical signals. The interface 132 in the embodiment described herein includes an opening 134 in a wall 136 of the housing 122, and a substantially transparent or translucent lens 138 disposed in a location that is generally aligned with or within the opening 134. In the exemplary embodiment described herein, the interface 132 further includes a spacing arrangement comprising a spacer 156, a magnet retainer 158 and a sleeve 160.

Figure 4A:
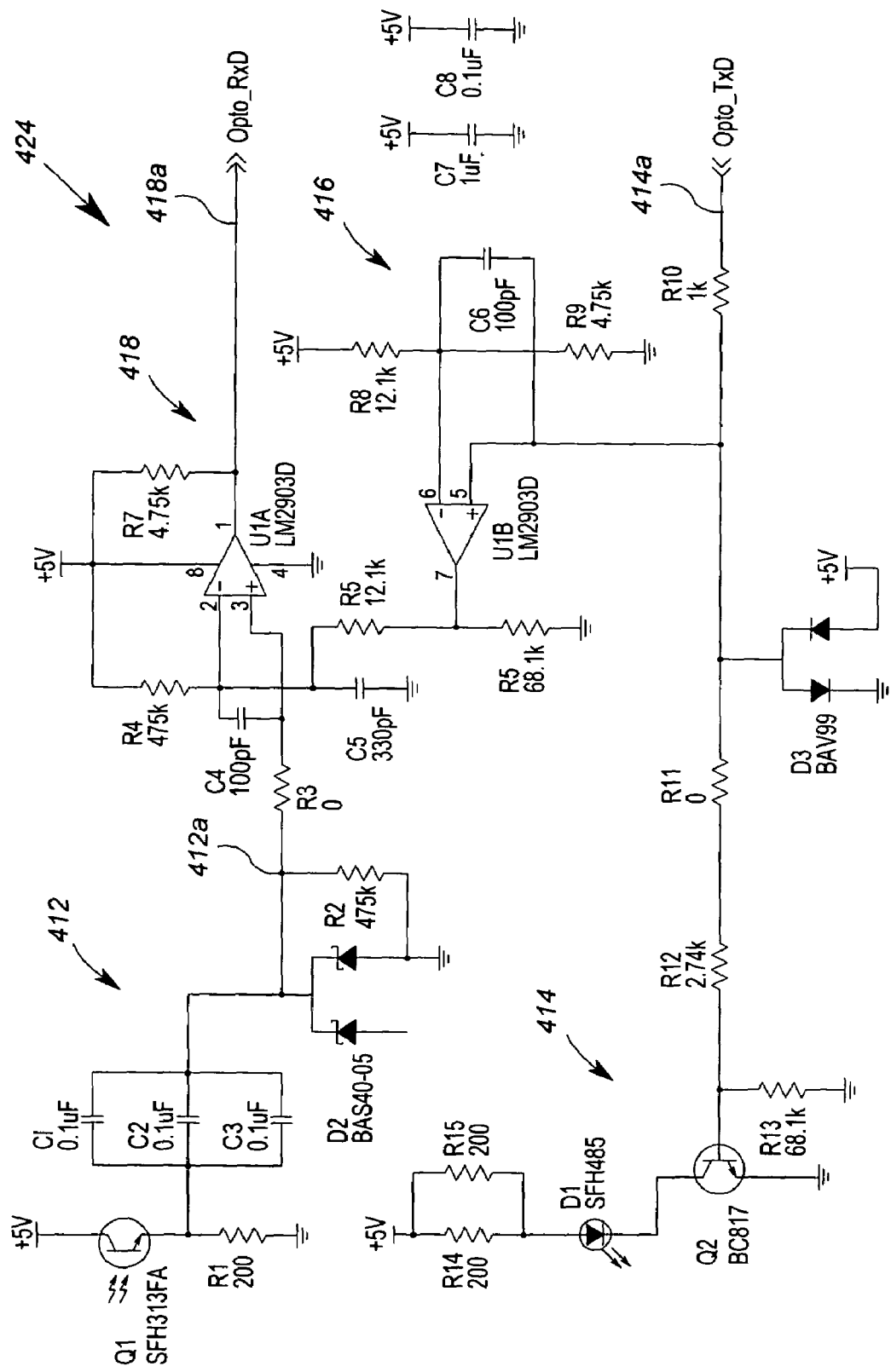
FIGS. 4a, 4b and 4c show detailed schematic diagrams of an exemplary probe unit that may be used in the arrangement of FIG. 1.

The optical communication circuit 124 includes optical elements 140 that are disposed proximal to the lens 138 in order to send and receive optical signals through the lens 138. In the embodiment described herein, the lens 138 is implemented as a sunlight filter lens that passes infrared light used for the optical communication, but filters out visible light and ultraviolet light to inhibit interference. The optical elements 140 may suitably include an optical detector and light emitting diode. FIG. 4a show examples of an infrared optical detector Q1 and an infrared light emitting diode D1 that may be used as the optical elements 140 of FIG. 2. The optical elements 140 are preferably mounted on a circuit board 162 that also supports the other electronic components described in FIGS. 1, 4a, 4b and 4c.

In the exemplary embodiment described herein, the housing 122 further includes a magnetic element 142 disposed in the vicinity of the opening 134. The magnetic element 142 is shown herein as a permanent magnet ring that surrounds the a central portion of the opening 134 through which the optical communication takes place, but may take other forms in other embodiments. For example, multiple magnetic elements may be disposed throughout the wall 136, and/or have different shapes. The magnetic element 142 is provided to help hold the probe 114 in position with respect to the meter 110 when communicating therewith.

In the embodiment described herein, the spacer 156 is a hollow generally cylindrical unit with two optical unit channels 156a and 156b at its top. The bottom of the spacer 156 is disposed against the circuit board 162 with the optical devices 140 extending up into the optical unit channels 156a and 156b. The lens 138 rests against the top of the spacer 156 and the magnet retainer 158 is disposed over the lens 138 and spacer 156. The magnet retainer 158 is generally cylindrical and hollow, and includes a notched retention surface 158a.

The main top wall 136 is in a single piece that also forms side walls (e.g. side wall 136b). The bottom wall 137 is in a single piece that also forms end walls and is configured to be coupled to the top wall 136 to close the housing 122. The opening 134 of the top wall 136 receives therethrough a portion of the spacer 156, the lens 138 and a portion of the magnet retainer 158. The notched surface 158a of the magnet retainer 158 engages the top wall 136 from underneath to retain the magnet retainer 158 in position under the top wall 136. The top wall 136 and magnet retainer 158 also cooperate to retain the lens 138 and spacer 156 in position.

The magnet retainer 158 and the magnetic element 142 are cooperatively sized such that the magnetic element 142 is disposed around the retainer 158, and rests on the upper part of the notched surface 158a. The magnetic element 142 is partly disposed within the opening 134, has its own center opening through which the lens 138, spacer 156 and retainer 158 extend.

The sleeve 160 is a mechanical structure having a generally cylindrical shaped body, features for retaining the magnetic element 142 and features 160b for engaging mechanical coupling features on common utility meters. The features 160b for ANSI standard optical communications in meters comprises a structure that represents a chorded off portion of the circular interface shape. In the embodiment described herein, the features 160b also include a small throughhole in the center of the structure or chorded off portion.

The cylindrical body of the sleeve 160 extends around the outside of the magnetic element 142 and further includes a lip 160a at its base. The lip 160a is configured to fit below a plate 164 that covers the top panel 136. The plate 164 has the general shape of the top panel 136, including an opening corresponding to the opening 134, and fits over the top panel 136 and engages the lip 160a of the sleeve 160, thereby retaining the sleeve 160 in place.

The operation of the data probe 114 is described below in reference to both FIGS. 1 and 2. In operation, a technician employs the data probe 114 in order to communicate information between the computing device 116 and the utility meter 110. Referring to FIGS. 1 and 2, the technician first disposes the data probe 114 in a position with respect to the optical port 112 of the utility meter 110 such that optical signals may be communicated therebetween. In the embodiment described herein, the interface 132 should be placed against the optical port 112 to allow for reliable communication.

To this end, the technician places interface 132 such that the opening 134 adjacent to and facing the optical port 112. The magnetic element 142 attracts to metal on the utility meter 110 to hold the data probe 114 in position so that the technician need not hold the data probe 114 in place. It will be appreciated that, instead of magnetic coupling, mechanical coupling or supporting arrangements such as the features 160b may alternatively (or additionally) be used for supporting the data probe 114 on the meter 110. However, use of a magnetic element 142 does not require the meter 110 to be especially designed to receive the data probe 114.

Once the data probe 114 is in place, the technician executes a program from the computing device 116 that is configured to communicate data with the meter 110.

Initially, the computing device 116 must set up a wireless physical and logical link with the probe 114. In general, once the wireless link or session between the computing device 116 and the probe 114 is established, the computing device 116 communicates with the meter 110 via the wireless link and the optical device 124.

Figure 3:
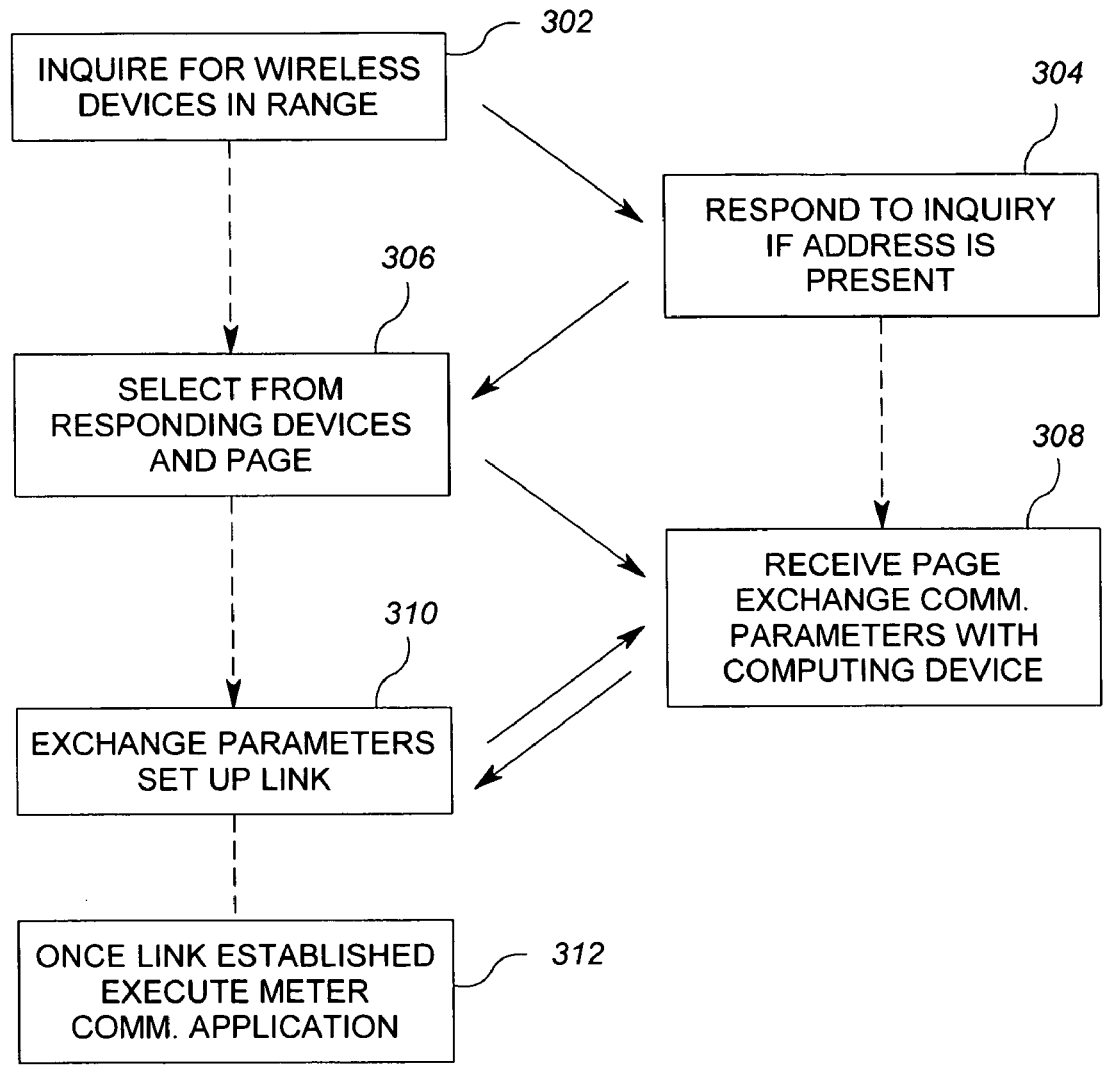
FIG. 3 shows a flow diagram of the exemplary steps that may be executed to establish a wireless communication link between the computing device and the wireless probe of FIG. 1.

FIG. 3 shows an exemplary set of operations that may be performed by the computing device 116 (by and through its wireless communication circuit 130) and the wireless probe 114 (by and through its wireless communication circuit 126). In the embodiment described herein, the communication link employs the Bluetooth protocol.

In step 302, the computing device 116 transmits a generalized inquiry to determine or detect which Bluetooth devices are in transmission range. In general, the computing device 116 operates as a master device on a Bluetooth piconet, and data probes within range are potential slave devices that may establish a communication link with the "master" device. In any event, the generalized inquiry may be received by one or more probes and/or other Bluetooth devices. However, it is presumed that at least the probe 114 of FIG. 1 is in range and receives the inquiry.

In accordance with the exemplary embodiment described herein, the computing device 116 crafts the generalized inquiry to include one or more addresses of known probes that the computing device 116 intends to contact. For example, in one embodiment, the user interface of the computing device 116, not shown, allows for a user to select from a stored list or group of probes that may be contacted. After user selection, the computing device 116 sends out an inquiry that includes the address of the selected probe. In the exemplary operation described herein, it is assumed that the address of the probe 114 of FIGS. 1 and 5 has been selected and is included in the generalized inquiry of step 302.

In step 304, the data probe 114 generates a response to the inquiry and transmits the response to the computing device 116. The response may suitably contain some identification information regarding the data probe 114. In a preferred embodiment, the data probe 114 is operating in a "private" mode, which means it only responds to inquiring masters that transmit the address of (or some other authentication information regarding) the probe 114. Thus, if an unknown master device randomly tries to communicate with the data probe 114, the data probe 114 will not respond because it has been configured to operate in private mode.

In contrast to a random unknown master device, the computing device 116 is configured (see step 302, discussed above) by the user to generate the address of the data probe 114 in the inquiry command. Accordingly, in step 304, the probe 114 generates an acknowledgement and transmits the acknowledgement to the computing device 116.

In other systems, even if the address were not included, it is preferred that the data probe 114 employ authentication before opening communications with the computing device 116 or any other configured "master" device.

In step 306, the computing device 116 receives the response to the inquiry from the data probe 114, as well as potentially other devices that received the inquiry. The computing device 116 then selects one of the responding devices, which in this case is the data probe 114, and pages the data probe 114.

In step 308, the data probe, and more particularly, the wireless communication circuit 126 of the data probe 114 commences exchanging communication link parameters with the wireless circuit 130 of the computing device 116. Similarly, the computing device 116 exchanges such parameters in step 310 with the wireless circuit 126 of the data probe 114 until the link session is successfully opened.

Thereafter, in step 312, the computing device 116 executes an application that exchanges communication messages with the meter 110 through the probe 114. These messages use the link established as described above to facilitate transfer between the wireless circuit 126 of the data probe 114 and the wireless circuit 130 of the computing device 116.

The operation of the application of step 312 is described in detail with reference to FIG. 1. The computing device 116 generates signaling information for the meter 110 and transmits the signaling information via the wireless communication circuit 130 to the wireless communication circuit 126 of the data probe 114 using the established wireless link. The wireless communication circuit 126 of the data probe 114 provides the signaling information to the optical communication circuit 124. The optical communication circuit 124 then transmits an optical signal that includes the signaling information to the optical port 112 of the meter 110. The optical port 112 of the meter 110 receives the signaling information, translates the information to an electrical signal, and provides the signal to the processing circuit 118 within the meter 110.

The processing circuit 118 within the meter 110 receives the signaling information, and generates a responsive signal. The responsive signal may include an acknowledgement of the initial signaling information, and/or may include metering information. Metering information may include data representative of measurements made by the meter, such as energy, gas or water consumption measurements. Metering information may also meter ID information, or other information related to measured consumption, or billing for consumption.

The optical port 112 of the meter 110 converts the responsive information into an optical signal, and transmits the optical signal to the optical communication circuit 124 of the data probe 114. The optical communication circuit 124 of the data probe 114 receives the optical signal and converts the signal to an electrical signal containing the responsive information. The optical communication circuit 124 provides the electrical signal to the wireless communication circuit 126. The wireless communication circuit 126 transmits the responsive information to the computing device 116 via the wireless communication circuit 130 of the computing device 116.

If the responsive information includes metering information, then the computing device 116 receives the information and stores the information and/or displays it. The computing device 116 preferably stores the information so that it may later communicate the information to centralized data processing equipment of the utility that provides the commodity being metered. The computing device 116 may also provide configuration information or control information to the meter 110 through the same transmission path/sequence. For example, if the meter 110 is to use a new billing structure, then the computing device 116 can communicate the new billing structure information vie the probe 114, using the combination of wireless and optical communications as described above.

As discussed further above, utility meters having the capability to communicate metering information and/or configuration information via an optical port are known in the art.

In another embodiment of the invention, the computing device 116 is configured to generate broadcast messages to a plurality of probes similar to probe 114, which are coupled to a plurality of meters. For example, there may be a requirement to configure certain metering parameters on a plurality of meters in the manufacturing floor, or in a distribution center. Several probes may be attached to several meters, and the computing device 116 would set up a piconet broadcast to each of the probes in steps 306, 308 and 310. The Bluetooth protocol enables such broadcast operation.

Figure 4B:
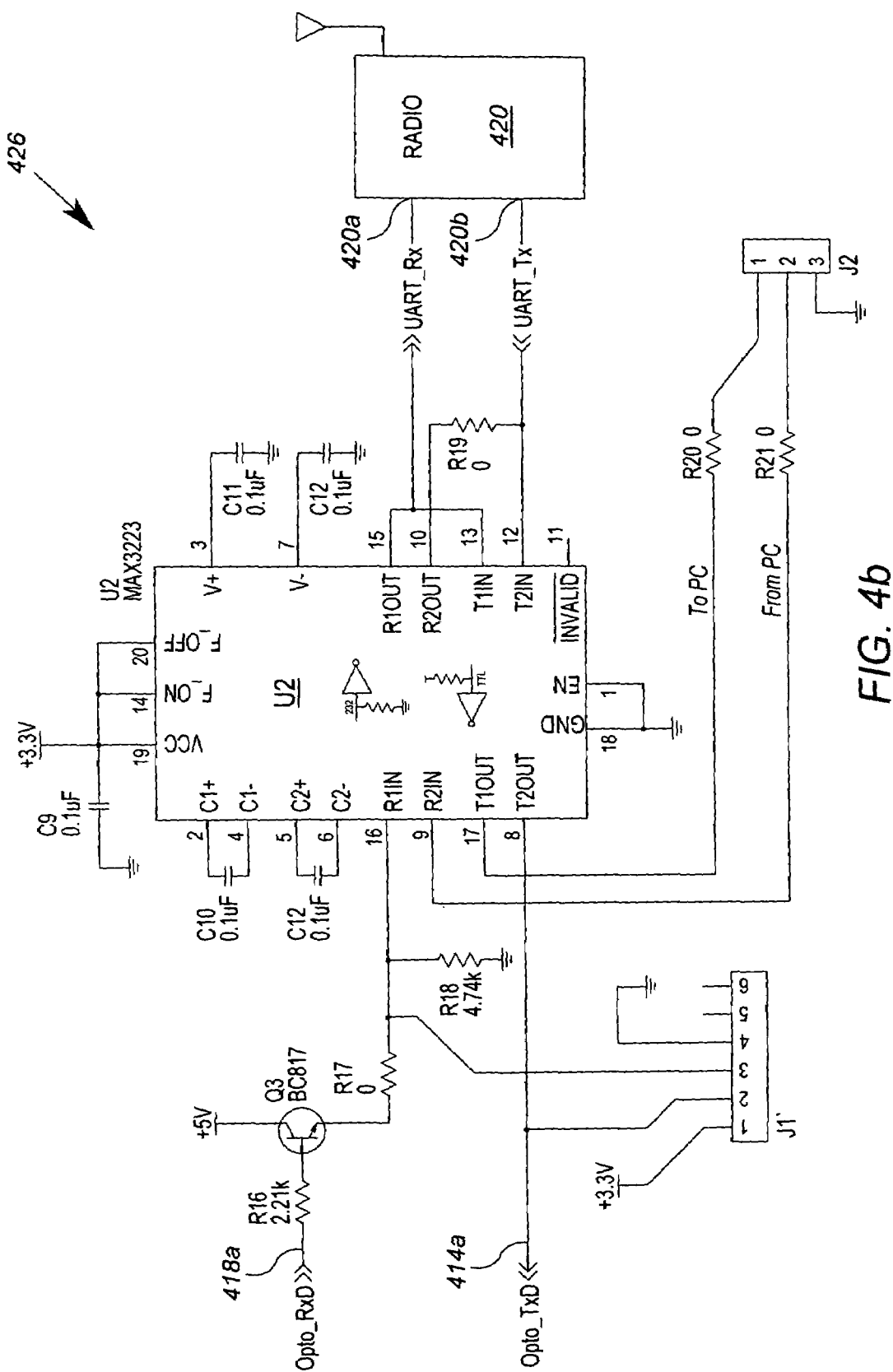
Figure 4C:
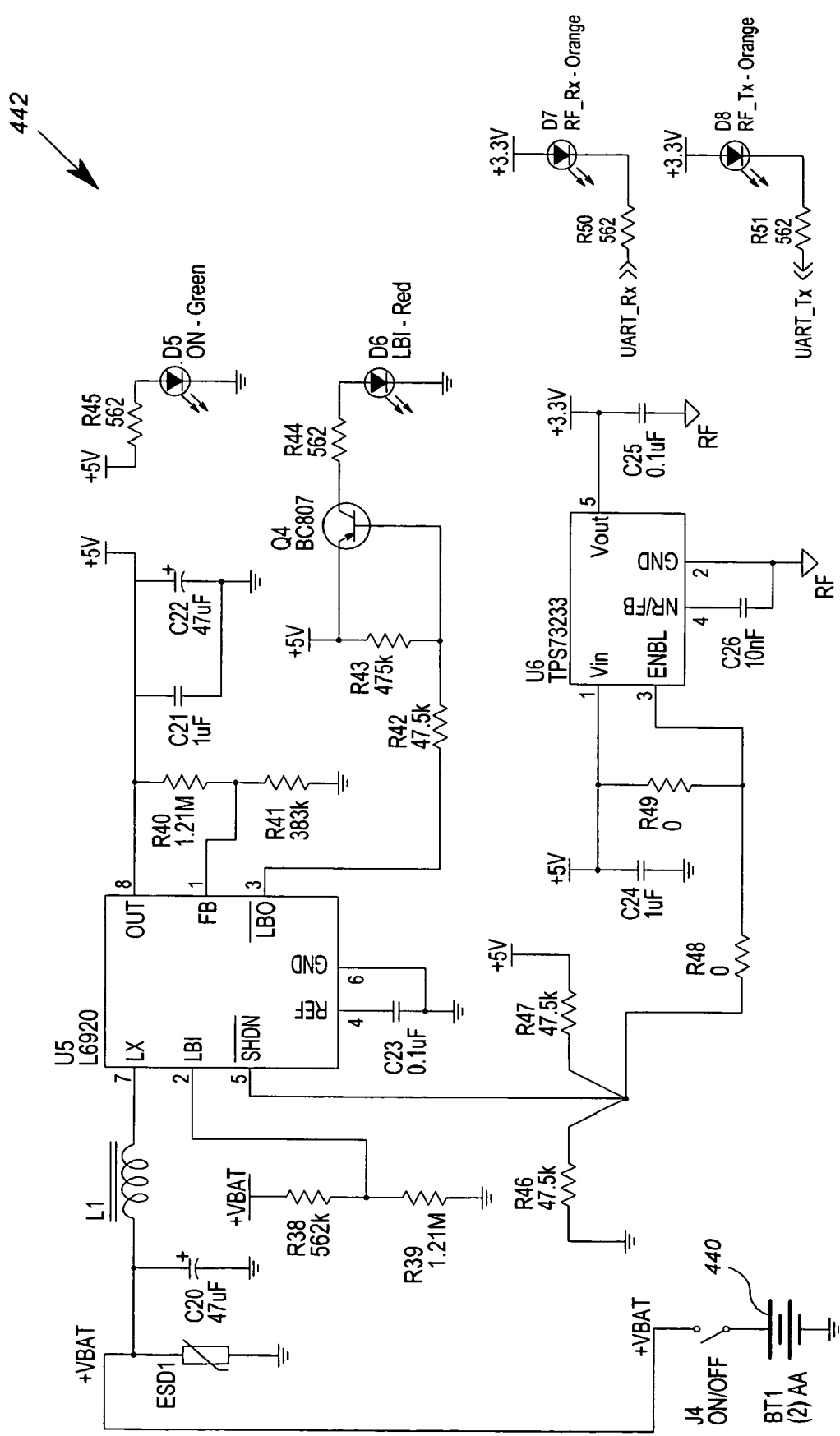

FIGS. 4a through 4c show in further detail a schematic diagram of an exemplary embodiment of a data probe that may be used as the data probe 114 of FIG. 1. The exemplary embodiment of FIGS. 4a through 4c show detail regarding a particular embodiment. It will be appreciated that various embodiments of the invention other than that shown in FIGS. 4a, 4b and 4c will benefit from the advantages of the invention. Nevertheless, the embodiment of FIGS. 4a through 4c have additional advantages, such as the ability to connect to a device that allows configuration of the wireless communication circuit, and the ability to use the probe as a wired probe when wireless communications are not possible or are undesirable.

FIG. 4a shows an exemplary embodiment of an optical transceiver circuit 424 of the data probe of FIGS. 4a, 4b and 4c. The optical transceiver circuit 424 includes an infrared optical detector Q1, a receiver front end 412, an infrared optical transmitter D1, a transmitter front end 414, a squelch circuit 416, and a conditioning circuit 418.

The optical detector Q1 may suitably be a model SFH313FA detector available from Osram Opto Semiconductors, Inc of San Jose, Calif. The receiver front end 412 includes a bias resistor R1 coupled between the detector Q1 and ground, three parallel capacitors C1, C2 and C3 coupled at one end between the bias resistor R3 and the detector Q1, and at the other end defining an output 412a. The capacitors C1, C2 and C3 may in some embodiments be replaced by a single capacitor. At least one clamping device D2 is coupled between the output 412a and ground. The detector Q1 is coupled between a bias voltage, herein 5 VDC, and the biasing resistor R1. The biasing resistor R1 in the embodiment described herein is a 200 ohm resistor. The biasing resistor R1 sets the bias level of detected signals. In particular, the optical signals are typically received as two level optical signals representative of a "1" or a "0". The brightness of the received signals changes the amount of current that is passed through the detector Q1 and thus over the bias resistor R1. The value of the bias resistor R1 dictates, at least in part, the level of the output voltage signal because the bias resistor R1 converts the optically generated current into a voltage.

While the embodiment described herein uses a static or nonvariable resistance for the bias resistor R1, it will be appreciated that other embodiments may employ a variable resistor controlled by a circuit (such as the processing circuit 520 of the embodiment of FIG. 5, discussed below) to adjust the gain of the input signal to account for varying levels of brightness in the received signals.

Referring again to the embodiment of FIG. 4a, the conditioning circuit 418 includes a level comparator U1A, capacitors C4 and C5, resistors R4 and R7 and a digital Rx signal output 418a. These elements are coupled as shown in FIG. 4a. The capacitor C4 is coupled across the differential inputs of the comparator U1A to provide RF decoupling.

The conditioning circuit 418 operates to receive the raw converted signals from the receiver front end 412 and produce output signals at levels of 0 or 5 volts. To this end, the level comparator U1A operates as a level detector, and the resistors R4, R5 and R6 set the comparison level. The capacitor C5 provides at least some filtering. The output of the level comparator U1A is coupled to the digital Rx signal output 418a.

The squelching circuit 416 includes a comparator U1B, biasing resistors R5, R6 R8 and R9, and capacitor C6. The comparator U1B has a noninverting input coupled to a digital Tx signal input 414a, and an inverting input connected to a bias point located between the resistors R8 and R9. The resistors R8 and R9 are serially connected between a 5 volt supply voltage and ground. The output of the comparator U1B is coupled through a voltage divider formed by resistors R5 and R6 to the level setting input of the comparator U1A. The squelching circuit 416 operates to suppress any feedback of signals transmitted by the transceiver 424 to the receiver front end 412.

The transmit front end 414 includes the digital Tx signal input 414a, resistors R12, R13, biasing resistors R14 and Rl5, a set of conversion diodes D3, a transistor Q2, and an infrared light emitting diode (LED) D1. In general, electrical digital signals received at the digital Tx signal input 414a are converted to optical light signals emitted by the LED D1. The LED D1 in the embodiment described herein is a SFH485 diode available from OSRAM Opto Semiconductors, Inc. of San Jose, Calif.

The conversion diodes D3 are configured to limit the voltage of the signal on the digital Tx signal input 414a between approximately 0 and 5 volts. For reasons that will be discussed below, the digital signals for transmission provided at the digital Tx signal input 414a are RS-232 level signals (−8 volts to +8 volts). The conversion diodes D3 convert those signals to the 0 to 5 volt range required by the transmitter front end 414.

The resistors R12 and R13 form a voltage divider at the control input of the transistor Q2. The biasing resistors R14 and R15 are coupled in parallel, and may suitably be a single resistor in other embodiments, between the 5 volt supply voltage and the LED D1. At the other side of the LED D1 is the collector of the transistor Q2. The emitter of the transistor Q2 is coupled to ground.

In general, the input digital signal is an RS-232 level digital signal that is present at the input 414a. The diodes D3 convert this signal from the RS-232 level (−8 volts to +8 volts) to logic levels of 0 and 5 volts. The converted signal then propagates to the input of the transistor Q2. When the converted input signal is at a high logic level (about 5 volts), the transistor Q2 conducts current through its collector/emitter junction, allowing current to flow through the LED D1. The LED D1 therefore emits light when the input signal is at a high logic level. When the converted input signal is a low logic level (less than 0.5 volts), the transistor Q2 does not turn on base to emitter junction, and the collector/emitter junction does not conduct current. As a consequence, no current flows through the LED D1 and no light is emitted.

Thus, the optical communication circuit 424 of FIG. 4a thus receives optical signals and generates 0 to 5 volt digital signals therefrom (digital Rx output 418*a*), and receives RS-232 digital electrical signals (digital Tx input 414*a*), and generates optical output signals therefrom.

FIG. 4*b* shows a schematic diagram of a wireless communication circuit 426 of the probe of FIGS. 4*a*, 4*b* and 4*c*. The circuit 426 generally includes a conversion device U2 and a wireless radio device 420. The conversion device U2 is configured to convert between the signal levels of the optical transceiver circuit 424 of FIG. 4*a*, and the 0 to 3.3 volt TTL logic levels used by the wireless radio device 420. The radio device 420 is operable to transmit as wireless signals information received at its circuit input 420*a* using TTL logic levels. The radio device is further operable to receive wireless signals and provide TTL logic level versions of the signals at its circuit output 420*b*.

The conversion device U2 of FIG. 4*b* is a MAX3223 RS-232 Transceiver available from Maxim Integrated Products of Sunnyvale, Calif. The device generally converts between RS-232 signal levels (–8 volts to +8 volts) and TTL levels (0 volts to 3.3 volts). However, the conversion device U2 also operates to translate 0 to 5 volt levels to TTL levels.

Optically received signals received by the receiver front end 412 are provided at the digital Rx output 418*a* having logic levels of 0 to 5 volts. The digital Rx output 418*a* is operably coupled to an input R1IN of the conversion device U2. The conversion device U2 is configured to converts signals received at the R1IN to TTL logic levels, and to provide the TTL logic level signals to the UART output R1OUT of the conversion device. The output R1OUT is operably coupled to the circuit input 420*a* of the radio device 420. The R1OUT is also coupled as a loop back to a TTL logic input T1IN of the conversion device U2 for reasons to be discussed below.

In addition, the input R1IN of the conversion device U2 is coupled to a jumper J1 which is configured to receive RS-232 signals from an external source, such as a programming device or computing device. This allows external access for control of the wireless radio device. As discussed above, the conversion device U2 is configured to convert the RS-232 signals received at R1IN to TTL level signals and provide the TTL level signals at the output R1OUT.

For signals that are received from the radio device 420 and which are to be transmitted optically by the transceiver 424, the conversion device U2 has an input T2IN coupled to the circuit output 420*b* of the radio device 420. The conversion device U2 is configured to convert TTL logic signals received at the input T2IN to RS-232 (–8 volt to 8 volt) signals and provide the resulting signal to the RS-232 output T2OUT. The TTL output R2OUT of the conversion device U2 can also be coupled in loopback fashion to the input T2IN for reasons that will be discussed below.

The RS-232 output T2OUT is coupled to the digital Rx output 414*a*, which provides the signals to the transmitter front end 414 of FIG. 4*a*, described above. The RS-232 output T2OUT is also coupled to the jumper J1 which allows for communication of control information from the radio device 420 and an external device such as a such as the programming device or computing device discussed above. The jumper J1 thus allows an RS-232 connection that communicates with the radio device 420.

The circuit 426 is also configured to allow an RS-232 connection that communicates through the optical transceiver circuit 424. In such a configuration, the probe of FIGS. 4*a*, 4*b* and 4*c* may operate as an ordinary wired probe instead of a wireless probe. To this end, the RS-232 input R2N and an RS-232 output T1OUT of the conversion device U2 are coupled to a jumper J2 that is configured to connect to RS-232 cables. The conversion device U2 is operable to convert RS-232 signals received at the input R2IN into TTL level signals, which are provided at the output R2OUT. The conversion device U2 is also operable to convert TTL level signals received from the input T1IN to RS-232 signals which are provided at the output T1OUT.

As a consequence, incoming signals received from the optical communication circuit 424 are first converted to TTL level signals from the input R1IN to the output R1OUT. The TTL level signals at the output R1OUT are looped back to the input T1IN, and then are reconverted to RS-232 and provided to the output T1OUT. The RS-232 level signals at the output T1OUT are provided to the jumper J2. The jumper J2 may connect to an RS-232 cable that couples to the computing device (computing device 116 of FIG. 1).

Similarly, signals that are received from J2, or the computing device attached thereto via the RS-232 cable, can be transmitted optically. To this end, the jumper J2 provides RS-232 input signals to the input R2IN of the conversion device U2. The conversion device U2 converts the RS-232 signals received at the input R2IN to TTL logic level signals which are provided at its output R2OUT. As discussed above, the output R2OUT is connected to loop back TTL logic level signals to the input T2IN of the converter U2. As discussed above, the U2 converter is operable to receive TTL logic level signals on the input T2IN and generate RS-232 signals on the output T2OUT. The output T2OUT is operably connected to provide the signals to the digital Rx input 414*a* of the transmitter front end 414 of FIG. 4*a*.

The radio device 420 in the embodiment described herein is a Bluetooth Module Assembly No. ASY90191 radio integrated circuit available from Smart Modular Technologies of Fremont, Calif. The radio device 420 has programmable parameters, and includes a processing circuit to this end, not shown. The radio device 420 is programmed by sending a special programming sequence upon power up to the input 420*a*. As discussed above, the programming sequence may be transmitted from an external computing device connected to the connector J2 via an RS-232 cable. The programming sequence may also come from the processor 520 in the alternative embodiment of the data probe 514 of FIG. 5, discussed below.

FIG. 4*c* shows an energy storage device or arrangement in the form of a battery set 440 and a power supply circuit 442. The arrangement of FIG. 4*c* may suitably be used as the arrangement 125 of FIG. 1 or the arrangement 525 of FIG. 5.

Referring to FIG. 4*c*, the power supply circuit 442 provides the various supply voltages used by the optical communication circuit 424 of FIG. 4*a* and the wireless communication circuit 426 of FIG. 4*b*. In the embodiment described herein, the power supply circuit 442 includes two different power conversion devices U5 and U6. The first power conversion device U5 is an L6920 DC-DC boost converter chip available from ST Microelectronics of San Jose, Calif., that is configured to steps up the voltage level of the battery set to the 5V DC operating voltage level of the probe 114, and U6 is a TPS73233 linear voltage regulator that steps down the output of U5 to the 3.3 VDC voltage level suitable for the wireless communication circuit 126.

The power supply circuit 442 in the embodiment described herein includes a low battery indicator circuit formed by a comparator circuit within the L6920 converter chip U5, a biasing switch Q4 and an LED D6. The comparator input LBI of the L6920 converter chip U5 is coupled to receive the battery output voltage via a high impedance divider circuit formed by R38 (562 k-ohms) and R39 (1.21 M-ohms). The output LBO of the L6920 converter chip U5 is normally high when the input voltage at LBI exceeds a low battery threshold, and goes low if the input voltage at LBI is lower than a low battery threshold. The low battery threshold is derived from the regulated output of the L6920 converter chip U5.

The output LBO is coupled to the base of the biasing switch Q4, which is implemented as a PNP bipolar transistor. The emitter of the biasing switch Q4 is coupled to the bias voltage generated by the L6920 converter chip U5. The collector is coupled to the LED D6 via a resistor R44 (562 ohms). Thus, when the output LBO is high (battery voltage=OK), the biasing switch PNP Q4 cannot turn on because the base voltage is high, equal to the emitter voltage. When the biasing switch PNP Q4 is off, insufficient current and voltage is available to turn on the LED D6. However, when the output LBO is low (battery voltage<OK), the biasing switch PNP Q4 turns on because the emitter-base voltage exceeds the base-emitter diode turn-on voltage. When the biasing switch Q4 turns on, the battery voltage flows through the resistor R44 and through the LED D6, causing the LED to be illuminated. It will be appreciated that the LED D6 will be illuminated even when the battery is low because the LED D6 is biased from the output of the converter U5, which stays relatively constant regardless of battery power.

It will be appreciated that many of the precise implementation details of FIGS. 4a, 4b and 4c are given by way of example only.

Figure 5:
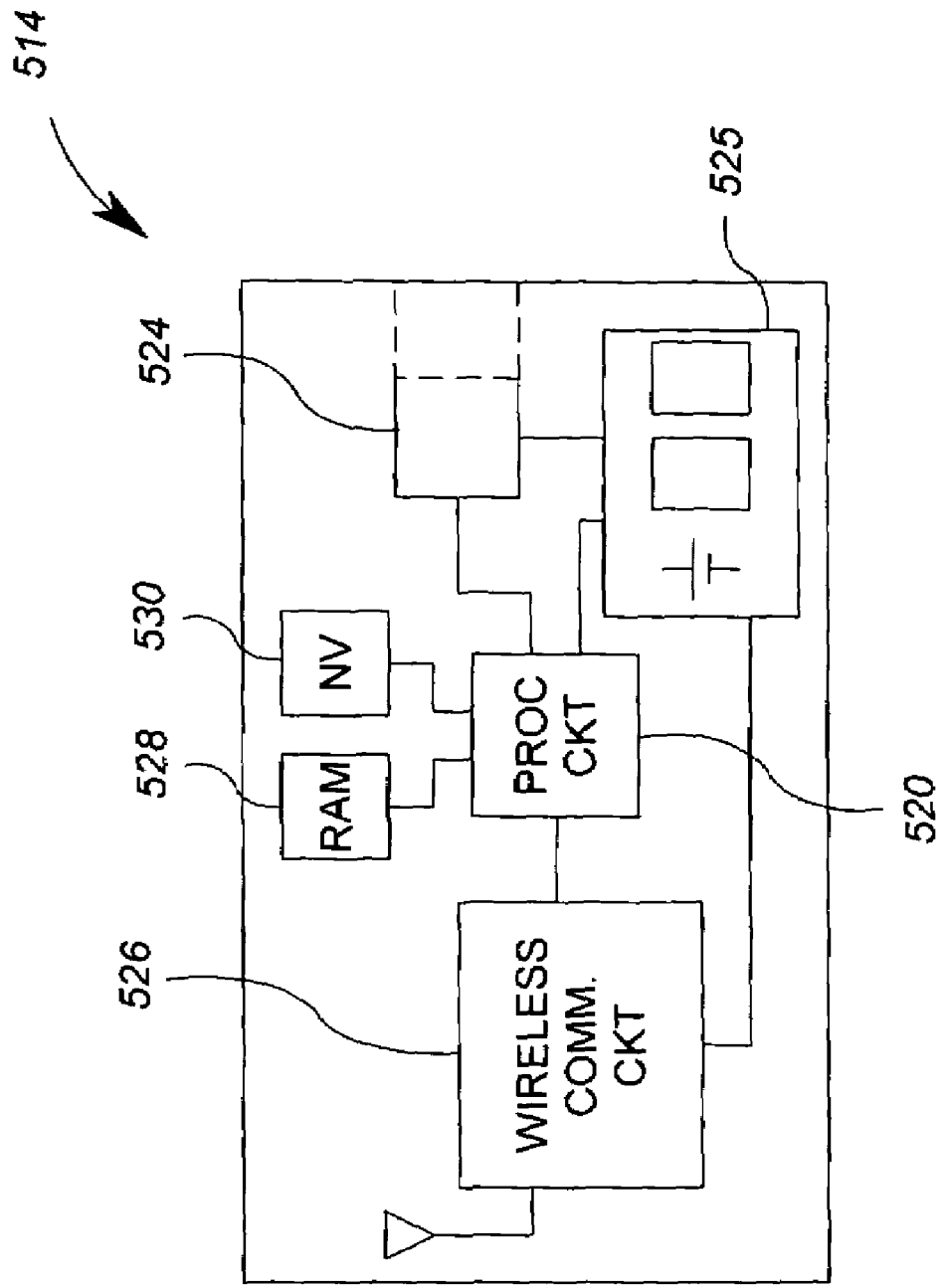
FIG. 5 shows a schematic block diagram of an alternative embodiment of a probe unit according to embodiments of the invention.

FIG. 5 shows a schematic block diagram of an alternative embodiment of the data probe 514 that may be used instead of the data probe 114 of FIG. 1. In FIG. 5, the probe 514 includes a wireless communication circuit 526 similar to the wireless communication circuit 126 of FIG. 1, an optical communication circuit 524 which may suitably be the same as the optical communication circuit 124 of FIG. 1, and a processing circuit 520. The probe 514 also includes a power supply arrangement 525 that may suitably be the same as the power supply arrangement 125 of FIG. 1 and/or that of FIG. 4c. The data probe 514 also preferably includes a volatile RAM memory 528 and a non-volatile memory 530.

The processing circuit 520 is operable to receive data signals from both the optical communication circuit 524 and the wireless communication circuit 526 and process the signals. More specifically, the processing circuit 520 is operable to receive signals from the optical communication circuit 524 and provide processed versions of those signals to the wireless communication circuit 526. Similarly, the processing circuit 52Q can receive signals from the wireless communication circuit 526 and provide processed versions of those signals to the optical communication circuit 524.

It is noted that the radio device 420 of the embodiment of FIG. 4b is programmable to some extent and may in some circumstances carry out some of the operations, and thus at least partly fulfill the rule of the processing circuit 520 as described herein. The programmability of the Bluetooth Module Assembly No. ASY90191 implementation of the radio device 420 is nevertheless limited. Accordingly, the radio device 420 with its embedded processing circuit may not be able to carry out various other functions described below. Thus, embodiments that implement the circuit of FIG. 5 will often include a processing device in addition to that included within the wireless communication circuit.

In general, the processing circuit 520 may be used to translate between signals configured for the computing device 116 and those configured for the meter 110. Such translation may include translation of data rate, signal polarity, protocols and the like. The purpose for such translation is that different meters may use different data communication protocols or formats. In the past, if translation for various meter communication types was even possible, then such translation had to occur with specialized software and/or devices in the computing device 116. In some cases, translation was not possible at all.

In accordance with the embodiment of FIG. 5, the processing circuit 520 is programmed to try a plurality of optical/data communication formats with the meter 110 until an intelligible response is detected. In another embodiment, the processing circuit 520 may be instructed as to the optical/data communication format to use by the computing device 116.

The non-volatile memory 530 preferably includes a flash memory or EEPROM memory, or another device that may be rewritten and retain its contents in the absence of bias power. The non-volatile memory 530 may be used to store programming instructions for the processing circuit 520, or at least parameters employed by the processing circuit 520 during data translation operations. The RAM 528 may be used for temporary storage and the storage of run-time variables and data.

In one alternative implementation, the non-volatile memory 530 may include programming instructions that cause the processing circuit 520 to perform the entire optical communication transaction with the meter 110 (see FIG. 1) to perform meter configuration or meter reading. In other words, instead of merely acting as a conduit for an application running on the computing device 116, the processing circuit 520 in the probe 514 may carry out many of the data gathering and other communication operations with the meter 110.

Figure 6:
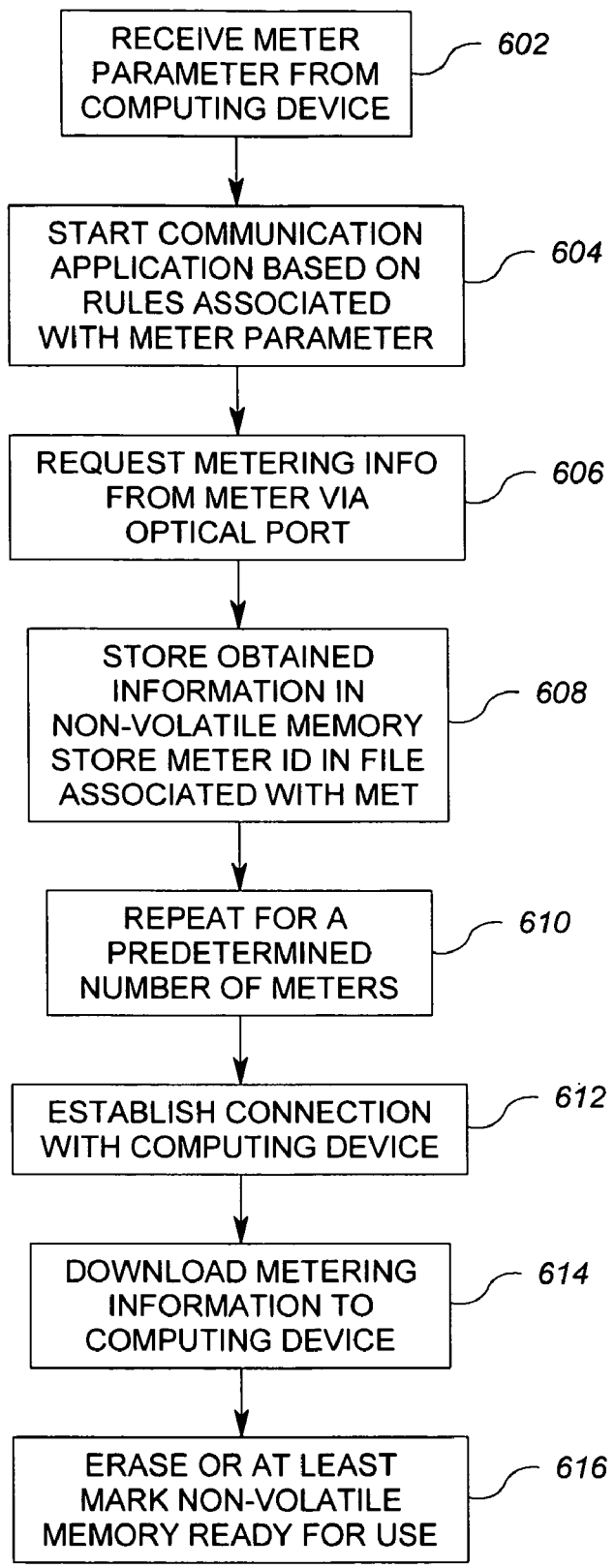
FIG. 6 shows an exemplary set of operations of the processing circuit of the probe of FIG. 5.

FIG. 6 shows an exemplary set of operations that may be carried out by the processing circuit 520 to carry out autonomous communication operations with meters. In step 602, the processing circuit 520 receives meter parameters regarding the meter (i.e. meter 110 of FIG. 1) to be communicated with. The meter parameters may be communicated to the probe 514 from the computing device 116 via a link established between the wireless communication circuits 526 and 130. (See also FIG. 1). The computing device 116 may also be used to identify what operation is to be performed, for example, reading and/or resetting the meter, reading out load profiling data from the meter, reading the meter register, programming a new display sequence, etc.

Between step 602 and 604, the probe 514 may suitably be moved to the meter 110 and affixed thereto. The communication link between the probe 514 and computing device 116 may be broken, as the computing device 116 no longer executes the actual communications with the meter 110. In step 604, the processing circuit 520 starts a communication operation with the meter 110 as configured in step 602. To this end, the processing circuit 520 executes program instructions stored in the non-volatile memory 530. The non-volatile memory 530 may suitably carry out different sets of instructions or parameters for different types of meters, and thus the configuration step 602 would only need identify the meter to be communicated with and the function to be carried out.

In step 606, the processing circuit 520 requests metering information from the meter 110 using the optical port 524. In step 608, the processing circuit 520 stores the information in the RAM 528 and/or nonvolatile memory 530. The information may be stored in RAM 528 particularly if the RAM 528 has a battery backup to retain the information when the probe 514 is turned off.

In step 610, the processing circuit 520 may repeat steps 604-608 with a number of meters so long as the meters are similar and similar information is to be obtained from each. For example, if the probe 514 is used to read several meters in an apartment complex, then such meters will often be identical. In such a case, the probe 514 in step 610 may repeat steps 604-608 for each meter in the apartment complex without intermediate involvement of the computing device 116. The limitation on the number of meters that may be read without downloading data to the computing device 116 will depend on the memory capacity of the probe 514, as well the amount of data to be read from each meter.

At some later time, in step 612, the processing circuit 520 causes the probe 514 to establish a wireless contact with the computing device 116, or some other computing device, for the purpose of downloading the meter data stored in the probe. After establishing the link in step 612, the processing circuit 520 communicates or transfers the meter information stored in step 608 to the computing device. Once the transfer of information is verified, the processing circuit 520 in step 614 erases the information or at least marks that the information may be erased, thereby freeing up memory for subsequent operations.

As discussed above, the power supply arrangement 525 of FIG. 5 may suitably be the power supply arrangement shown in FIG. 4c. Accordingly, in FIG. 5, the power supply arrangement 525 is shown to include chips U5 and U6 of FIG. 4c. In another alternative implementation of FIG. 5, one embodiment takes advantage of the "enable" control pins on U5S and U6 (or equivalent ICs) to allow processor 520 to turn on/off the probe and radio circuitry to implement different battery power conservation schemes. In general, the processing circuit 520 is programmed to monitor activity of the optical communication circuit 524 and/or the radio module and determine whether to turn the power off automatically to key portions of the power supply arrangement 525.

In one embodiment, the processing circuit 520 (and RAM 528) is operably coupled to receive bias power from the output of the L6920 converter chip U5. The enable pins of both the L6920 converter chip U5 and the TPS73233 linear voltage regulator chip U6 are coupled to different I/O pins of the processing circuit 520. The enable pin of the converter chip U5 is also coupled to a master on-off switch, not shown, but which may be part of the power supply arrangement of FIG. 4c.

In this embodiment, if the processing circuit 520 does not receive any data flow for some predetermined amount of time, the processing circuit 520 generates outputs, provided to enable pins of U5 and U6, that cause the converter chip U5 and the regulator chip U6 to be switched to the off state. The processing circuit 520 may also determine whether to turn off the U5 and/or U6 chip based on whether RF activity is sensed by the wireless circuit 526.

It will be appreciated that the above described embodiments are merely exemplary and that those of ordinary skill in the art may readily devise their own implementations and modifications that incorporate at least some of the principles of the present invention and fall within the spirit and scope thereof.

We claim:

1. A method, comprising:
    a) communicating optical signals from a utility meter to an optical communication circuit of a probe, the optical signals including metering information in the form of digital data generated at least in part by a digital processor within the utility meter;
    b) communicating the metering information from a wireless communication circuit of the probe to a wireless communication circuit of a computing device;
    c) storing the metering information in the computing device; and
    prior to step a), establishing a wireless communication link between the computing device and the wireless communication circuit, wherein establishing the wireless communication link further comprises transmitting from the computing device a wireless signal having information corresponding to the wireless communication circuit, the wireless communication circuit configured to establish the wireless communication link only after receiving the wireless signal having the information.

2. The method of claim 1, wherein the information corresponding to the wireless communication circuit is unique to the wireless communication circuit.

3. The method of claim 1, wherein step a) further comprises:
    communicating the optical signals from the utility meter though an interface of a housing of the probe.

4. The method of claim 1, wherein step a) further comprises:
    communicating the optical signals from the utility meter though a lens of a housing of the probe.

5. The method of claim 1, wherein step a) further comprises:
    communicating the optical signals from the utility meter though a sized opening of a housing of the probe.

6. The method of claim 1, further comprising a step of retaining the probe against the utility meter at least in part using a magnet.

7. The method of claim 1, further comprising providing power to the wireless communication circuit using a battery.

8. The method of claim 1, further comprising a step of using level conversion circuitry disposed between the wireless communication circuit and the optical communication circuit, the level conversion circuitry operable to convert a first maximum level digital signal to a second maximum level digital signal.

9. The method of claim 8, wherein the second maximum level digital signal is a TTL standard signal.

10. The method of claim 1, wherein step b) further comprises communicating the metering information to the computing device using a wireless modem integrated circuit.

11. The method of claim 10, wherein step b) further comprises communicating the metering information using Bluetooth standard wireless signals.

12. The method of claim 1, further comprising:
    d) communicating configuration information from the wireless communication circuit of the computing device to the wireless communication circuit of the probe; and
    e) communicating further optical signals to the utility meter from the optical communication circuit of the probe, the further optical signals including the configuration information.

13. A method, comprising:
    a) communicating optical signals from a utility meter to an optical communication circuit of a probe, the optical signals including metering information in the form of digital data generated at least in part by a digital processor within the utility meter;
    b) communicating the metering information from a wireless communication circuit of the probe to a wireless communication circuit of a computing device;
    c) storing the metering information in the computing device;
    d) using level conversion circuitry disposed between the wireless communication circuit and the optical communication circuit, the level conversion circuitry operable to convert a first maximum level digital signal to a second maximum level digital signal;
    wherein step a) comprises receiving the optical signals using an optical detector device operably coupled to a bias voltage source, the bias voltage source having a voltage level exceeding a maximum level of the second maximum level digital signal.

* * * * *